CONVEYOR SYSTEM
Filed Sept. 18, 1961
3 Sheets-Sheet 1
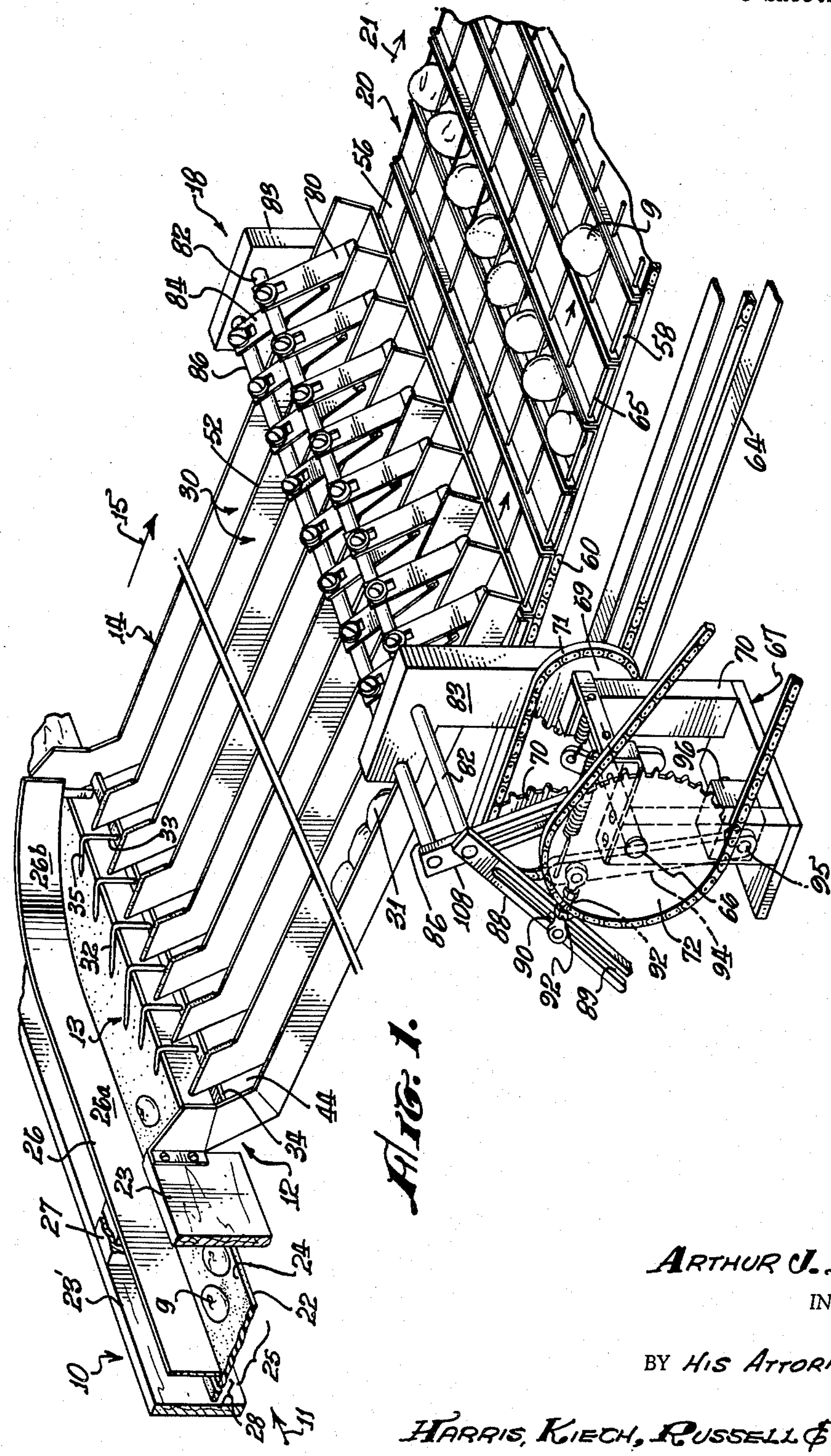
ARTHUR J. BROWN,
INVENTOR.
BY HIS ATTORNEYS.
HARRIS, KIECH, RUSSELL & KERN.

April 20, 1965
A. J. BROWN
3,179,230
CONVEYOR SYSTEM
Filed Sept. 18, 1961
3 Sheets-Sheet 2
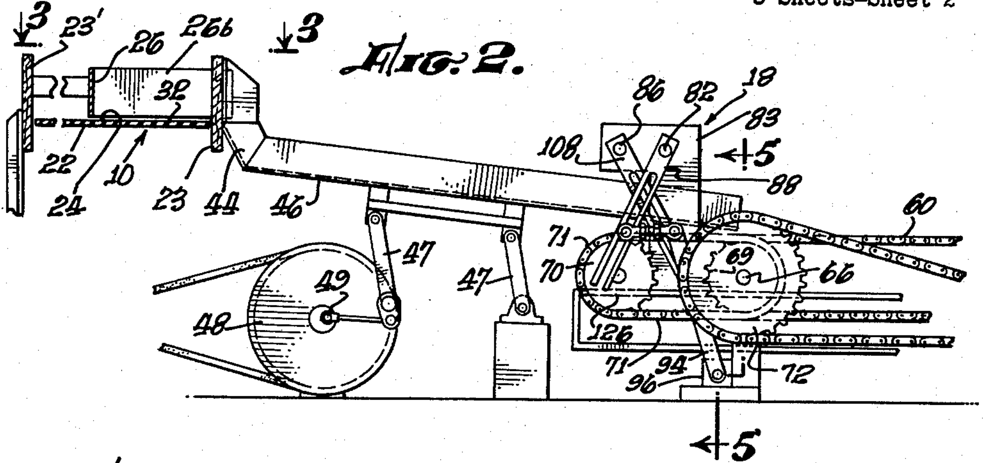
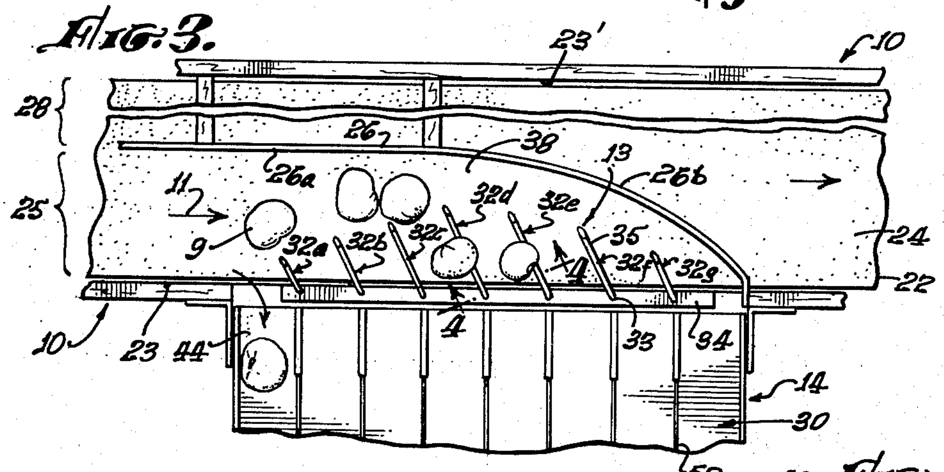
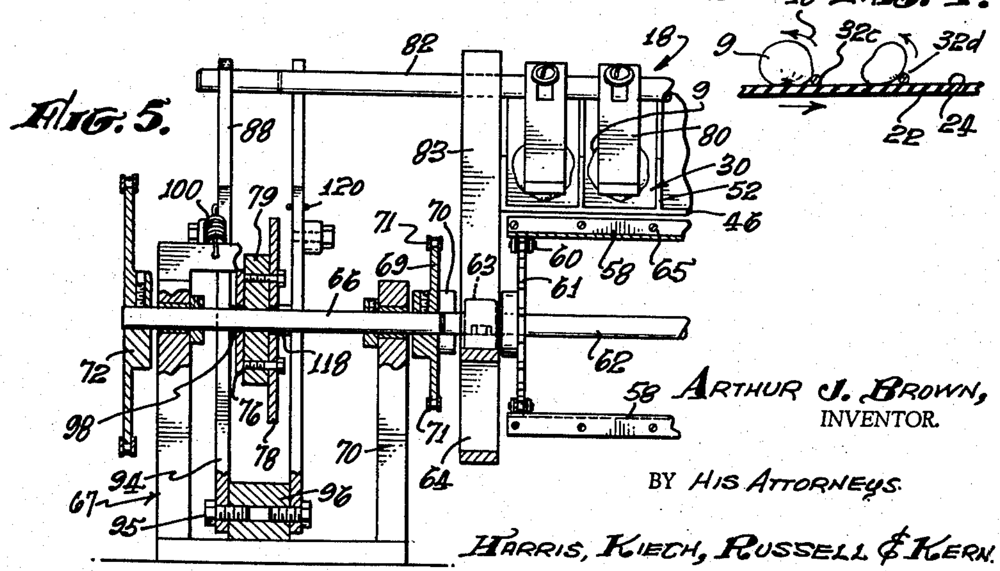
ARTHUR J. BROWN,
INVENTOR.
BY HIS ATTORNEYS.
HARRIS, KIECH, RUSSELL & KERN.

April 20, 1965 A. J. BROWN 3,179,230
CONVEYOR SYSTEM
Filed Sept. 18, 1961 3 Sheets-Sheet 3
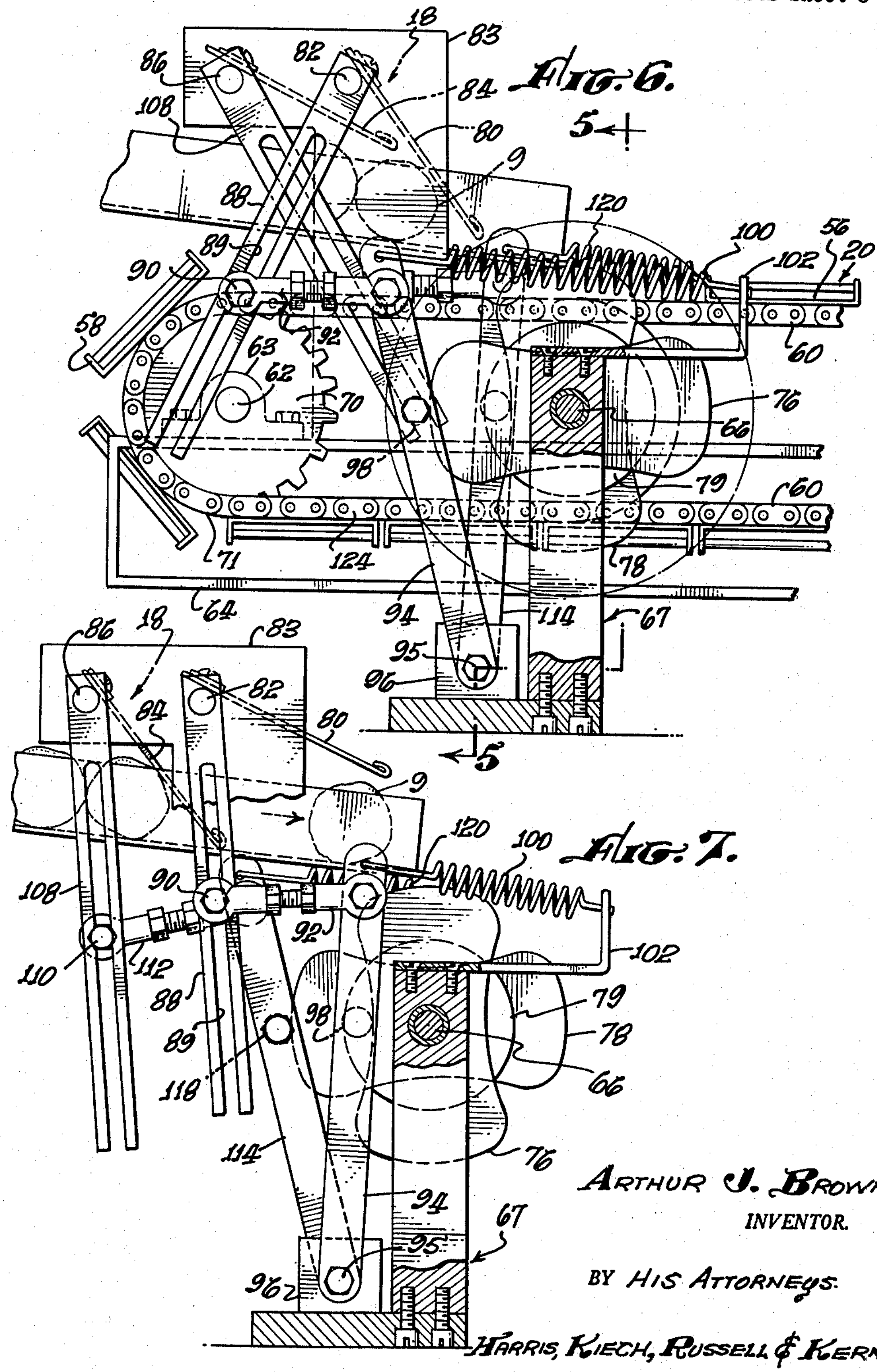

United States Patent Office 3,179,230

Patented Apr. 20, 1965

3,179,230
CONVEYOR SYSTEM

Arthur J. Brown, San Leandro, Calif., assignor to Hunt Foods and Industries, Inc., Fullerton, Calif., a corporation of Delaware Filed Sept. 18, 1961, Ser. No. 138,679
9 Claims. (Cl. 198—30)

My invention relates to conveyor systems for fruit or other generally round objects and more particularly to a shearing unit which will transfer objects from one conveyor to another moving at an angle thereto. It will be illustrated as applied to a shearing unit adapted to remove fruit randomly arranged on a feed conveyor to a receptive conveyor, e.g. a shake table, which advances the fruit at right angles to the feed conveyor. The invention relates also to a device controlling the discharge of the objects from the receptive conveyor to a process conveyor and arranging them side by side in transverse rows on the latter.

Exemplifying the invention as applied to the coring and peeling of fancy tomatoes, it is the present practice to employ manual labor for transferring tomatoes from their random arrangement on a feed conveyor to pockets or sockets of a process conveyor which moves them into a peeling machine where they are peeled and cored, the tomatoes being placed stem end down in the respective sockets. It is an object to mechanize such operation in large part to minimize manual handling of the fruit, make the operation more rapid and produce substantial economies in the operation.

Another object of the invention is to displace randomly positioned objects from a feed conveyor into a plurality of side-by-side channels disposed transversely with respect to the direction of forward advance of such conveyor, these channels discharging to another conveyor such as a shake table. To displace the objects from the feed conveyor the invention provides for interrupting the forward advance of objects in one or more bands of the feed conveyor in such way as to cause rolling of the objects on the surface of the feed conveyor and usually contact between objects that may reach the locus of the discharge in spaced relation.

It is an object of the invention to employ a plurality of transverse rods adjacent the support surface of the feed conveyor extending across a band thereof. This band may constitute the complete width of a narrow feed conveyor or a fraction of the width of a wider conveyor, the objects rolling into and along inter-rod spaces to a plurality of spillways which transfer the objects to a receptive conveyor in longitudinal rows respectively in longitudinal channels of the latter conveyor.

A further object is to impede the normal advance of such objects induced by the receptive conveyor while maintaining them in the longitudinal row arrangement and to release the forward objects simultaneously from all of such longitudinal rows onto a process conveyor in a manner to arrange the objects in longitudinal and transverse rows. More broadly it is an object to impede the normal advance of objects induced by the receptive conveyor and discharge them in such sequence as to form a uniform pattern of objects on the process conveyor, e.g. into receptive sockets therefor. Should any channel be momentarily void of objects during the normal discharge cycle it is possible for a single operator to fill any resulting void in the pattern if all sockets or positions on the process conveyor are to be filled.

It is sometimes desirable that the objects be oriented uniformly within such pattern. Tomatoes or fruit somewhat flatter at the stem end will largely be automatically oriented in a stem-end-down position during operation of the invention. Those that are not can be manually turned in their respective sockets to orient them uniformly with the others if this is desired for subsequent processing.

Further objects and advantages of the invention will be evident to those skilled in the art from the following description of an exemplary embodiment.

Referring to the drawings:

FIG. 1 is a fragmentary perspective view of the invention;

FIG. 2 is a side elevational view thereof;

FIG. 3 is a plan view showing a portion of the feed conveyor and the receptive conveyor, being taken along the line 3—3 of FIG. 2;

FIG. 4 is a diagrammatic view taken along the line 4—4 of FIG. 3 illustrating the rolling action of the objects as they are displaced from the feed conveyor;

FIG. 5 is a sectional view taken along the lines 5—5 of FIG. 2 and FIG. 6;

FIG. 6 is a fragmentary view showing the escapement mechanism in a position to block the leading object of a row; and FIG. 7 is a fragmentary view of the escapement mechanism in a position to release the previously-blocked object.

As best shown in FIG. 1, the complete apparatus of the invention is adapted to displace randomly-positioned generally-round objects 9 from a feed conveyor 10 advancing in the direction of the arrow 11. A row-forming displacement means 13 acts to displace the objects sidewardly from the feed conveyor to a receptive conveyor 14 disposed at a lateral angle with respect to the feed conveyor 10 and adapted to advance the objects in the direction of the arrow 15 while in longitudinal rows. An escapement means 18 releases the objects onto a process conveyor 20 which advances in the direction of the arrow 21 and carries the objects into any suitable processing apparatus, not per se a part of the present invention. The invention will be exemplified as applied to the transport of select tomatoes or other fruit from the feed conveyor 10 to the processing equipment, which may in this instance comprise a lye peeler which desirably receives the fruit in a stem-down position for impalement on suitable spikes or coring members before or during the peeling operation.

The feed conveyor 10 may be of any suitable type, being shown as including a belt 22 advancing between rails 23, 23′ and providing a support surface 24 on which the objects 9 rest in random pattern. The invention is adapted to remove such objects as lie in a longitudinal band 25 of the conveyor formed between the rail 23 and a barrier 26 attached by supports 27 to the opposite rail 23′. This band-bounding barrier 26 has a straight portion 26a extending longitudinally of the feed conveyor and an end portion 26b, preferably curved as shown in FIGS. 1 and 3, angling toward the discharge side of the feed conveyor. Between the far end of the barrier 26 and a terminal end of the rail 23 is a laterally-open discharge passage.

The band 25 may occupy all or any side portion of the support surface 24. FIGS. 1 and 3 show a wider conveyor with a band 28 laterally opposite the band 25. Objects carried on the support surface 24 in the band 28 may pass between the barrier 26 and the rail 23′ to be displaced at a later position into the band 25 and subsequently displaced sidewardly therefrom to one or more other receptive conveyors 14.

It is desired to remove the fruit or other objects 9 from the band 25 through the aforesaid laterally-open discharge passage into longitudinal channels 30 of the receptive conveyor 14 without bruising the fruit, the fruit collecting in longitudinal rows 31 in each channel. The preferred way of accomplishing this is by means of a plurality of rods 32 (FIG. 1) immediately above but closely adjacent the support surface 24 and designated as *32a–32g* in FIG. 3 for purpose of separate identification. As shown these rods include base portions 33 rigidly attached to a mounting member 34 which in turn is mounted below the level of the support surface 24 parallel to the edge of the belt 22. The rods include also object-rolling portions 35 extending parallel to the support surface in a zone immediately thereabove. The rods 32 are thus mounted as cantilevers with their object-rolling portions 35 pointing toward the barrier 26.

The rods 32 have circular upwardly-facing crests and lie in a zone only a small fraction of an inch in height. For displacing tomatoes or objects of similar size circular rods of a diameter in the neighborhood of ¼ inch are preferred. The object-rolling portions 35 of such rods are mounted as close as practical to the support surface 24, being no more than a small fraction of an inch thereabove. The distance above the support surface is usually less than the diameter of the rods and it is possible to employ rods which engage the moving support surface 24. It is preferred however to support the object-rolling portions 35 minutely above the surface 24.

All of the object-rolling portions 35 need not be of equal length and it is usually preferred to make them of progressively longer length in the direction of advance of the objects 9. If the barrier 26 is straight throughout its length the longest of the object-rolling portions may extend thereto. However with the barrier 26 shaped as shown the free ends are preferably disposed in an arcuate pattern similar to that shown in FIG. 3 wherein the longest rod **32*d* terminates short of the barrier 26 to form an object-passing passage 38 through which some of the objects 9 may pass to be later deflected by the later rods 32*e*, 32*f* or 32*g*. Forward of the longest rod 32*d* the rods 32*c*, 32*b* and 32*a* are preferably progressively shorter in length to extend lesser distances across the band 25. Stated in other words, the object-rolling portions of the rods opposite any substantially longitudinal section 26*a* of the barrier 26 are of progressively increasing length in the direction of object advance. However opposite the angling end portion 26*b*** the lengths of the object-rolling portions progressively decrease in the direction of object advance. The spacing of the rods in such direction is usually somewhat larger than the diameter of the objects to be displaced.

The objects tend to be displaced laterally of the direction of movement of the conveyor 10 even if the object-rolling portions of the rods 32 are perpendicular to such direction. However additional impetus toward lateral movement can be given by slightly inclining the support surface 24 or, as is preferred, by disposing the object-rolling portions to angle toward the advancing objects. FIG. 3 shows such portions extending at a small angle relative to planes perpendicular to the direction of conveyor movement. This angle should be relatively small and may vary from a few degrees up to about 45 degrees, the angular relationship in FIG. 3 being close to the maximum.

When randomly-arranged objects on the support surface 24 reach the rods 32 their forward movement tends momentarily to be restrained thereby. However as the weight of the object continues to press it against the moving support surface 24 any tendency to stop the forward advance of the object results in a rolling thereof, suggested by the arrow 40 of FIG. 4. This rolling is in part the result of the limited area of contact between the rod and the object, this limited contact offering little frictional restraint to turning of the objects induced by the movement of the support surface 24.

The rods 32 are always disposed to contact the rounded object in its lower half and in some instances it will be found that an object rolling in one inter-rod space may roll over its contacting rod into the next inter-rod space. This sometimes occurs if the direction of advance of the surface 24 is too rapid or if the object is engaged by other rolling objects. However most of the objects will roll in the inter-rod spaces in which they respectively find themselves and will be subjected to a lateral component of motion during the rolling, induced for example by the slight forward inclination of the rods. The result is the continual displacement of objects to the receptive conveyor 14 from the inter-rod spaces at positions spaced longitudinally of the direction of movement of the feed conveyor 10.

The thus-displaced objects roll into angled spillway or chute portions 44 of the receptive conveyor 14, these portions forming the entrance ends of the longitudinal channels 30. While various types of receptive conveyors can be employed I prefer to use a shake table in this regard. This includes a movable base member 46 supported by legs 47 which are oscillated toward and away from the feed conveyor 10 by any suitable means, shown diagrammatically as including a drive wheel 48 with an eccentric 49 connected to one of the legs 47. The movable base member 46 may be substantially horizontal if the mechanism is such as to retract it toward the feed conveyor 10 more rapidly than the rate of movement in the opposite direction, the rapid vibrations advancing the objects along the longitudinal passages 30. By disposing the movable base member 46 at a slight slope, as suggested in FIG. 2, the forward advance of the objects will be more rapid and it becomes possible to employ a drive mechanism in which the forward and rearward movements of the movable base member are at substantially equal rates. In the embodiment shown the surface of the movable base member is divided by longitudinal partitions 52 forming the channels 30 therebetween.

The escapement means 18 delays the discharge of the objects from the exit ends of the longitudinal channels 30 so that longitudinal rows of these objects build up in the channels. It is designed to release simultaneously the foremost objects of each row as a laterally arranged series of objects to one of a number of transverse rows of object-receiving positions on the process conveyor 20. Each object-receiving position is preferably determined by the location of a corresponding pocket 56 of the process conveyor, the pockets or positions being arranged in crossing sets of rows, one set of rows being transverse and preferably perpendicular to the direction of movement of the process conveyor and the other set of rows being longitudinal. The pockets of the transverse rows are moved sequentially across the aligned exit portions of the longitudinal channels 30 by a suitable drive means, later described, which also operates the escapement means 18 in timed relationship.

The process conveyor 20 may be of any suitable type but is shown as comprising transverse trays 58 centrally attached at opposite ends to two endless chains 60 surrounding and driven by sprockets 61 one of which is shown in FIG. 5, these sprockets being mounted on a shaft 62 journalled in bearings 63 mounted on a frame member 64. The forward end of each chain loop surrounds a similar sprocket beyond the processing equipment so that the trays are moved successively therethrough by the upper runs of the chains 60. Short rods 65 (FIG. 1) may partition each tray 58 into the compartments 56. A pattern of pockets or object-receiving positions on the process conveyor 20 in which the lateral rows are perpendicular to the direction of advance is preferred but this is not necessarily the case. Here and elsewhere the term "lateral" or "transverse" is used in a broad sense and not limited to an exact perpendicular relationship.

A drive shaft 66 (FIG. 5) is journalled in a U-shaped support 67 and driven by a sprocket 68 therebeyond forming the drive means for the process conveyor and the escapement means 18. A sprocket 69 on the shaft 66 drives a sprocket 70 on the shaft 62 through a chain 71, this chain driving the process conveyor 20. The escapement means 18 is driven by cams 76 and 78 attached to a collar member 79 mounted on the shaft 66.

The escapement means includes a discharge series of stop members 80, one at the exit end of each of the longitudinal channels 30. An interconnecting means shown as a shaft 82 journalled in posts 83 interconnects and mounts the stop members 80 to move simultaneously between downward or object-blocking positions (FIG. 6) and upward or object-releasing positions (FIG. 7). When in downward position in the embodiment shown these stop members engage the foremost object of the respective longitudinal rows 31 and restrain the entire row from its tendency to move forward caused by the oscillation of the receptive conveyor 14. When these stop members are moved to their upper position such foremost objects are simultaneously released into a now-aligned transverse row of the pockets 56.

To hold the remaining objects in the longitudinal rows when the stop members 80 are lifted, the escapement means 18 provides a holding series of stop members 84 interconnected by a shaft 86 to move same simultaneously from a downward or holding position (FIG. 7) impeding the forward advance of the remaining objects in the channels to an upward or object-releasing position (FIG. 6) releasing the series so that the now-foremost object in each channel can advance to engage the corresponding stop member 80 of the discharge series, now in downward position. The stop members 80 and 84 are formed as arms adjustably mounted on the respective shafts 82 and 86 to control the forward extension thereof and permit adjustment of the machine to feed objects of different size to the pockets of the process conveyor 20. The shafts 82 and 86 are journalled on parallel axes by the side posts 83 and extend forwardly beyond one of these to overlie the planes of the cams 76 and 78.

Means is provided for moving the stop members 80 of the discharge series alternately and in timed relation with the movement of the stop members 84 of the holding series. When the stop members 80 are in downward or object-blocking position the stop members 84 should be in the upper or object-releasing position. To accomplish this result the extending end of the shaft 82 carries an operating arm 88 providing a longitudinal slot 89 in which a pivot block 90 is adjustably secured. An adjustable link 92 is pivoted at one end to this pivot block 90 and at its other end to the upper end of an upright arm 94 pivoted at its lower end by a bolt 95 to a block 96 mounted within the U-shaped support 70 at the base thereof. A cam follower 98 (FIG. 6) forms a part of the upright arm 94 and engages the double-lobed cam 76. A spring 100 is tensioned between the upper end of the arm 94 and a bracket 102 to hold the cam follower 98 against the surface of the cam 76. The cam-induced movement of the stop members 80 of the discharge series is readily apparent from FIG. 6, showing the stop member in object-blocking position, and FIG. 7, showing the stop member in object-releasing position.

In like manner the shaft 86 carries an operating arm 108 supporting an adjustable pivot block 110 (FIG. 7) connected by an adjustable link 112 to an upright arm 114 similarly pivoted at its lower end and similarly carrying a cam follower 118 (FIG. 7) engaging the double-lobed cam 78 under the action of a spring 120. The lobe axes of the two cams 76 and 78 are disposed at right angles to each other to provide the alternate movement of the stop members 80 and 84 desired.

The process conveyor 20 and the escapement means 18 are thus driven in timed relationship. Each time the stop members 80 of the discharge series raise to release the foremost lateral series of objects a transverse row of the pockets 56 is present at the exit ends of the longitudinal channels 30 to receive the discharge objects. The pockets are thus completely filled if longitudinal rows 31 of objects are in the respective longitudinal channels 30. Any blank pockets 56 can be filled by a single operator who can also orient the fruit in stem-down position. Very little reorientation is necessary as fruit like tomatoes, peaches and the like tend normally to assume a stem-end-downward position due to the action of the arms 32 and the oscillations of the receptive conveyor 14.

Various generally-round objects other than fruit can be successfully handled by the equipment and the invention provides automatic positioning thereof in a desired pattern on the process conveyor 20 even though the objects are randomly positioned on the feed conveyor 10. Such objects can be relatively fragile as they are not subjected to large forces as they move through the apparatus of the invention.

While an exemplary embodiment of the invention has been illustrated and described it will be apparent that various changes and modifications will be apparent to those skilled in the art and fall within the scope of the appended claims.

I claim:

1. In an apparatus for transferring generally round objects positioned randomly on a support surface of a feed conveyor to a receptive conveyor disposed at a lateral angle with respect to the feed conveyor, the combination of: means for rolling said objects on said surface and laterally displacing same toward said receptive conveyor during such rolling, said means including a plurality of rods spaced longitudinally of said feed conveyor to form inter-rod spaces opening laterally of the feed conveyor, and means for mounting said rods immediately above but closely adjacent to said support surface in positions to extend laterally of a longitudinal band thereof to engage the advancing objects on said longitudinal band of said support surface exclusively in the lower halves of such advancing objects and effect said rolling thereof as a result of such engagement.

2. An apparatus as defined in claim 1 including a mounting member at and closely adjacent to that side of said feed conveyor adjacent said receptive conveyor, said rods respectively providing base portions attached to and positioned by said mounting member as the sole support for such rods.

3. An apparatus as defined in claim 2 in which said mounting member is below the level of said support surface and in which said base portions of said rods are upright, said rods including object-rolling portions extending parallel to said support surface.

4. An apparatus as defined in claim 1 in which said rods have circular crests and lie in a zone only a small fraction of an inch in height.

5. An apparatus as defined in claim 4 in which said rods are circular rods of a diameter in the neighbordhood of one-fourth inch and are spaced no more than a small fraction of an inch above said support surface.

6. An apparatus as defined in claim 1 in which each of said rods angles toward the advancing objects on said support surface throughout the length of such rod and to a tip thereof disposed above said support surface.

7. An apparatus as defined in claim 1 in which said rod provide object-rolling portions extending as cantilevers from said mounting means, some of said object-rolling portions closest to the advancing objects being of shorter length than the object-rolling portions farther removed from such advancing objects.

8. An apparatus as defined in claim 7 including a band-bounding barrier extending longitudinally of said feed conveyor above said support surface, the longest object-rolling portion terminating short of said barrier to form an object-passing passage, said barrier providing an end portion beyond such longest object-rolling portion extending toward the side of said feed conveyor, said object-rolling portions being of progressively shorter length opposite said end portion of said barrier.

9. In an apparatus for displacing generally round objects laterally from a support surface of an advancing feed conveyor, the combination of: a receptive conveyor extending laterally of said support surface and providing a plurality of side-by-side longitudinal channels extending laterally of the direction of advance of said feed conveyor, said channels having entrance ends facing said feed conveyor and exit ends spaced from such entrance ends; a plurality of rods each having a base portion and an object-rolling portion; means anchoring said base portions of said rods at between-channel positions opposite the entrance ends of said channels with said object-rolling portions closely overlying said support surface and extending in substantially parallel relation into a longitudinal band of such surface to be engaged exclusively by the lower portions of the advancing objects, each inter-rod space opening on the entrance end of one of said channels; and means for moving said receptive conveyor to advance along said channels the objects received thereby from the respective inter-rod spaces.

References Cited by the Examiner

UNITED STATES PATENTS

| | | | |
|---|---|---|---|
| 860,936 | 7/07 | Norkewitz | 198—28 X |
| 1,429,092 | 9/22 | Paranteau | 198—26 X |
| 2,572,164 | 10/51 | Lehmann. | |
| 2,685,358 | 8/54 | Heil | 198—30 |
| 2,699,278 | 1/55 | Wysocki | 53—160 |
| 2,805,755 | 9/57 | Jones | 198—34 |
| 2,840,223 | 6/58 | Schoppee | 198—34 |
| 2,844,926 | 7/58 | Mattos | 53—160 |
| 2,968,899 | 1/61 | Holmes | 53—246 |

SAMUEL F. COLEMAN, *Acting Primary Examiner.*

EDWARD A. SROKA, ERNEST A. FALLER, Jr., *Examiners.*